United States Patent
Maeda et al.

(10) Patent No.: US 10,052,840 B2
(45) Date of Patent: Aug. 21, 2018

(54) LAMINATED NON-WOVEN FABRIC, AND MANUFACTURED ARTICLE USING THE SAME

(75) Inventors: Noriko Maeda, Shiga (JP); Junji Iwata, Shiga (JP); Yasushi Matsuda, Shiga (JP); Mitsuru Kojima, Shiga (JP)

(73) Assignees: JNC CORPORATION, Tokyo (JP); JNC FIBERS CORPORATION, Tokyo (JP)

( * ) Notice: Subject to any disclaimer, the term of this patent is extended or adjusted under 35 U.S.C. 154(b) by 876 days.

(21) Appl. No.: 13/877,172

(22) PCT Filed: Oct. 3, 2011

(86) PCT No.: PCT/JP2011/072780
§ 371 (c)(1),
(2), (4) Date: Apr. 1, 2013

(87) PCT Pub. No.: WO2012/046694
PCT Pub. Date: Apr. 12, 2012

(65) Prior Publication Data
US 2013/0209763 A1 Aug. 15, 2013

(30) Foreign Application Priority Data
Oct. 5, 2010 (JP) ................................. 2010-225691

(51) Int. Cl.
| | |
|---|---|
| B32B 5/02 | (2006.01) |
| D04H 1/559 | (2012.01) |
| D04H 1/541 | (2012.01) |
| D04H 3/14 | (2012.01) |
| D04H 5/06 | (2006.01) |
| B32B 5/26 | (2006.01) |

(52) U.S. Cl.
CPC ............ *B32B 5/022* (2013.01); *B32B 5/26* (2013.01); *D04H 1/541* (2013.01); *D04H 1/559* (2013.01); *D04H 3/14* (2013.01); *D04H 5/06* (2013.01); *B32B 2250/20* (2013.01); *B32B 2260/021* (2013.01); *B32B 2260/046* (2013.01); *B32B 2262/0253* (2013.01); *B32B 2262/0276* (2013.01); *B32B 2262/04* (2013.01); *B32B 2555/00* (2013.01); *Y10T 428/24942* (2015.01)

(58) Field of Classification Search
CPC .. B32B 5/022; B32B 5/26; D04H 5/06; Y10T 428/24942
USPC ........................................................ 428/212
See application file for complete search history.

(56) References Cited

U.S. PATENT DOCUMENTS

| | | | |
|---|---|---|---|
| 5,306,545 A | 4/1994 | Shirayanagi et al. | |
| 2003/0190463 A1* | 10/2003 | Inoue | B32B 7/12 428/337 |
| 2009/0238849 A1 | 9/2009 | Iwata et al. | |

FOREIGN PATENT DOCUMENTS

| | | |
|---|---|---|
| CN | 1262712 | 8/2000 |
| CN | 101538799 | 9/2009 |
| EP | 0989222 | 3/2000 |
| EP | 2103424 | 9/2009 |
| JP | 05-033257 | 2/1993 |
| JP | 05-171556 | 7/1993 |
| JP | 2003-166161 | 6/2003 |
| JP | 2008-000696 | 1/2008 |
| JP | 2009-256856 | 11/2009 |
| JP | 2010-155454 | 7/2010 |
| WO | 2007/098449 | 8/2007 |
| WO | 2011/004696 | 1/2011 |

OTHER PUBLICATIONS

Properties of Polypropylene Fibres, http://syntechfibres.com/polypropylene/properties-of-polypropylen-fibres/, Nov. 2, 2015.*
"The Extended European Search Report", dated Aug. 21, 2015, pp. 1-7, in which the listed references were cited.
"1st Office Action of China Counterpart Application", dated Dec. 25, 2014, with English translation thereof, p. 1-p. 18, in which two of the listed references (CN101538799A and CN1262712A) were cited.
"2nd Office Action of China Counterpart Application", dated May 28, 2015, with English translation thereof, p. 1-p. 16.
"Office Action of China Counterpart Application", dated Jan. 13, 2016, with English translation thereof, p. 1-p. 15.
"Office Action of Taiwanese Counterpart Application", dated Jan. 22, 2016, with English translation thereof, pp. 1-11.
"International Search Report (Form PCT/ISA/210)", published on Dec. 20, 2011, with English translation thereof, p. 1-p. 4, in which the listed references (JP2009-256856, JP2010-155454, JP2003-166161, JP05-171556, EP0989222) were cited.

* cited by examiner

Primary Examiner — Lawrence Ferguson
(74) Attorney, Agent, or Firm — JCIPRNET

(57) ABSTRACT

A laminated non-woven fabric and a manufactured article using the laminated non-woven fabric are provided. The laminated non-woven fabric is formed by clamping a fibrous layer B between two of fibrous layer A, wherein the fibrous layer B is obtained by using a fiber melting or softening at 120° C. or less, and fibrous layer A includes a fiber neither melting nor softening at 120° C. or less, in which the fibrous layer A and the fibrous layer B are integrated through point thermal compression bonding, and interlayer peeling strength between the fibrous layer A and the fibrous layer B ranges from 0.3 Newton (N)/25 millimeters (mm) to 4.0 N/25 mm.

7 Claims, No Drawings

LAMINATED NON-WOVEN FABRIC, AND MANUFACTURED ARTICLE USING THE SAME

CROSS-REFERENCE TO RELATED APPLICATION

This application is a 371 application of an international PCT application serial no. PCT/JP2011/072780, filed on Oct. 3, 2011, which claims the priority benefit of Japan application no. 2010-225691, filed on Oct. 5, 2010. The entirety of each of the above-mentioned patent applications is hereby incorporated by reference herein and made a part of this specification.

BACKGROUND OF THE INVENTION

1. Field of the Invention

The present invention relates to a laminated non-woven fabric including a fibrous layer obtained by using a fiber melting or softening at 120° C. or less, and a manufactured article obtained by using the laminated non-woven fabric.

2. Description of Related Art

The non-woven fabric using the polyolefin thermal adhesive fiber is favored because of such characteristics as the tender hand feeling and the high non-woven fabric strength, and is used for such hygienic materials as the disposable diaper and the menstrual article. Generally, the heat treatment method used to manufacture the thermal adhesive fiber into the non-woven fabric may be substantially categorized into two methods as follows: the hot air-through bonding process utilizing the suction band dryer or the suction dryer, and the point thermal compression bonding process utilizing the so-called embossment machining in which a web is introduced between a heated embossing roll having multiple projections and a flat roll (smoothing roll) to obtain the non-woven fabric. Particularly, compared with the hot air-through bonding process, the latter point thermal compression bonding process has more excellent producibility, and therefore, is also advantageous in the cost. However, as the recent tendency, the non-woven fabric of the surface material used for the hygienic material obtained through the point thermal compression bonding machining is required to have more tender hand feeling. Therefore, the industry is conducting research on a method for constraining the machining temperature to be low or a method for reducing the area ratio of the point thermal compression bonding portion.

In the method for constraining the machining temperature to be low, the thermal bonding in the non-woven fabric becomes insufficient, the non-woven fabric strength is inadequate or the interlayer peeling is caused, which becomes the reason for generating the fluff, so the problem of fluff resistance deterioration exists.

On the other hand, in the method for reducing the area ratio of the point thermal compression bonding portion, although the degree of freedom of the fiber is increased, and the hand feeling is improved, the interlayer peeling is generated easily and the strength of the non-woven fabric becomes insufficient, so the fluff resistance deterioration tends to exist.

Additionally, as the non-woven fabric having the tender hand feeling, in a tri-layered construction of a layer formed of a polyethylene terephthalate long fiber between layers formed of the long fiber (core-sheath conjugate) of polyethylene terephthalate as a core component, and high density Polyethylene (PE) as a sheath component, it is proposed that, the whole of the non-woven fabric is formed into the laminated non-woven fabric by the local point thermal compression bonding (for example, referring to patent document 1).

According to the construction, the intermediate layer of the polyethylene terephthalate long fiber includes the resin component with the melting point higher than that of the fiber of the upper layer and the lower layer, so even if the intermediate layer is subject to the point thermal compression bonding, the fiber in the intermediate layer is bonded to each other less, and the fiber becomes easily and freely movable, so that the softness of the non-woven fabric is maintained. However, on the other hand, it is difficult to obtain sufficient strength of the non-woven fabric, and if it is intended to perform high temperature treatment on the fiber in the upper layer and the lower layer in order to obtain the strength, it is easy to weld the embossing roll, but the stable producibility (maneuverability) may not be sufficiently satisfied. Furthermore, because the bonding between laminated layers is inadequate, so when the non-woven fabrics are rubbed each other, the peeling between laminated layers is easily generated, and the outcome is that the fluff resistance can neither be sufficiently satisfied.

DOCUMENT IN THE PRIOR ART

Patent Document

[Patent document 1] Japanese Patent Publication No. H5-33257

SUMMARY OF THE INVENTION

Technical Problem

Accordingly, the present invention is directed to a laminated non-woven fabric solving the problem and a manufactured article using the laminated non-woven fabric.

Solution to Problem

By conducting repetitive and studious research in order to solve the problem, the inventors find that, the laminated non-woven fabric formed by clamping a fibrous layer B between two of fibrous layer A as an intermediate layer, wherein the fibrous layer B includes a fiber with a melting point or softening point lower than that of a fiber forming the fibrous layer A, may solve the problem, so as to complete the present invention.

Therefore, the present invention has the following construction.

(1) A laminated non-woven fabric, in which the laminated non-woven fabric is formed by clamping a fibrous layer B between two of fibrous layer A, wherein the fibrous layer B is obtained by using a fiber melting or softening at 120° C. or less, and the fibrous layer A includes a fiber neither melting nor softening at 120° C. or less, the fibrous layer A and the fibrous layer B are integrated through point thermal compression bonding, and interlayer peeling strength between the fibrous layer A and the fibrous layer B ranges from 0.3 Newton (N)/25 millimeters (mm) to 4.0 N/25 mm.

(2) The laminated non-woven fabric according to (1), in which an area ratio occupied by a point thermal compression bonding portion on a surface of the laminated non-woven fabric ranges from 2% to 40%.

(3) The laminated non-woven fabric according to (1) or (2), in which at the point thermal compression bonding portion, a fiber forming the fibrous layer A maintains a fiber shape, and at a bonding point of a fiber forming the non-woven fabric, a fiber forming the fibrous layer B deforms in a manner of increasing a contact area with a surface of the fiber forming the non-woven fabric and is bonded integrally.
(4) The laminated non-woven fabric according to any one of (1) to (3), in which the fiber forming the fibrous layer B is an elastomer fiber.
(5) The laminated non-woven fabric according to any one of (1) to (4), in which the fibrous layer B is a fibrous layer formed of mixing at least two types of elastomer fibers with different melting points or different softening points.
(6) The laminated non-woven fabric according to any one of (1) to (5), in which the fiber forming the fibrous layer B is an ultrafine long fiber with a fiber diameter being from 0.5 micrometer (μm) to 15 μm.
(7) A manufactured article, in which the manufactured article is obtained by using the laminated non-woven fabric according to any one of (1) to (6).

Effects of the Present Invention

The laminated non-woven fabric of the present invention is the laminated non-woven fabric having the sufficient interlayer peeling strength.

According to the construction of the laminated non-woven fabric of the present invention, the fibrous layer A including the fiber neither melting nor softening at the temperature at which the fiber forming the fibrous layer B melts or softens is used as the external layer, so that the surface of the non-woven fabric may not be damaged, and the machining temperature during the point thermal compression bonding is set to be high. Additionally, a laminated body may be obtained, which has the tender hand feeling and the sufficient interlayer peeling strength without damaging the hand feeling, and has less fluff. Therefore, the fibrous layer A including the fiber neither melting nor softening at the temperature at which the fiber forming the fibrous layer B melts or softens is located at the external side, so that the welding and the winding for the embossing roll are not generated during the point thermal compression bonding, thereby being capable of performing the stable production in the long term.

Also, in a purpose requiring the water absorbability, the non-woven fabric may be obtained, in which an impregnated amount (liquid preservation amount) of a liquid component is high.

DESCRIPTION OF THE EMBODIMENTS

Hereinafter, the present invention is illustrated in detail according to implementation aspects of the present invention.

A laminated non-woven fabric of the present invention includes: a fibrous layer A including a fiber neither melting nor softening at 120° C. or less, and a fibrous layer B using a fiber with a melting point or a softening point lower than that of the fiber of the fibrous layer A (melting or softening at 120° C. or less).

The fiber included in the fibrous layer A of the present invention may be a monocomponent fiber, and may also be a conjugate fiber, or a mixed fiber formed by mixing two or more types of fibers. When the fiber is the mixed fiber, preferentially two or more types of fibers are fibers neither melting nor softening at 120° C. or less, but can also include a fiber melting or softening at 120° C. or less at a proportion of 40 mass % or less or preferably 20 mass % or less based on the mass of the fibrous layer A only if the effects of the present invention are not damaged. However, in this case, although the fiber is not hindered from using the fiber having lower melting point or softening point than that of the fiber component participating in bonding between the fiber forming the fibrous layer B, preferentially the melting point or softening point difference does not reach 10° C. Furthermore, the component having higher melting point or softening point than that of the fiber component in the fibrous layer B is more preferential. Additionally, in this case, the component having the melting point or softening point 10° C. higher than that of the fiber component in the fibrous layer B is more preferential. The fiber to be mixed may be a fiber obtained by using such as polyester, polyolefin or polyamide, or a conjugate fiber formed by combining two or more of them.

When the fiber neither melting nor softening at 120° C. or less forming the fibrous layer A has a melting point or softening point, as regards the aspect that when the point thermal compression bonding is performed on the laminated non-woven fabric, the welding or winding for the embossing roll is not generated, and the high temperature treatment may be performed as if the laminated non-woven fabric has the sufficient interlayer peeling strength, preferentially the melting point or softening point of the fiber is higher by 5° C. or more and more preferentially higher by 10° C. or more than the melting point or softening point of the fiber melting or softening at 120° C. or less and forming the fibrous layer B.

Additionally, as long as the effects of the present invention are not damaged, the fibrous layer A may also use a fiber formed by mixing two or more resins at any mixing ratio.

The fiber neither melting nor softening at 120° C. or less includes a fiber neither having the melting point nor having the softening point, or a fiber melting or softening at the temperature higher than 120° C. For example, such fiber may be exemplified: a cellulose fiber such as cotton and linen, wool, silk, rayon, cuprammonium, pulp, a semi-synthetic fiber obtained by using cellulose, and a fiber obtained by using a thermoplastic resin.

In the present invention, as described in the following, because the inter-fiber gap may be effectively ensured, the non-woven fabric may effectively obtained, which is suitable for maintaining good liquid preservation property used for impregnating the liquid. In this case, particularly, the hydrophilic fiber is preferentially used as the fibrous layer A. The hydrophilic fiber may be preferably used for the cosmetic sheet material that impregnates the cosmetic liquid or medicine liquid.

The thermoplastic resin forming the fibrous layer A may be for example a polyolefin resin, polyvinyl chloride, polystyrene, an Acrylonitrile Butadiene Styrene (ABS) resin, a polyamide resin, a polyester resin, a polycarbonate resin, a modified polyphenylene ether, and nylon.

The fiber neither melting nor softening at 120° C. or less and forming the fibrous layer A is not particularly limited, and may be a short fiber, or may be a long fiber. When the fiber forming the fibrous layer A is the short fiber, the manufacturing method may be exemplified as follows: the short fiber is arranged in a direction to form a card web, or the short fiber is randomly accumulated to form an air-laid web or wet type paper making web, and the needling punch or spunlaced (hydroentanglement) is utilized to make the fiber three-dimensionally entangle so as to obtain the non-woven fabric. When the fiber forming the fibrous layer A is the long fiber, the manufacturing method may be a method for obtaining the long fiber, such as: a melt-blown process, a spun-bond process and a tow opening process. In a purpose requiring the water absorbability, the wet type paper making web or spunlaced non-woven fabric is preferential.

The length of the fiber forming the fibrous layer A including the fiber neither melting nor softening at 120° C. or less of the present invention is not particularly limited, but as far as that the sufficient fiber entangling and the uniform non-woven fabric are obtained is concerned, the length is preferentially 2 mm to 100 mm. Corresponding to the specific method for adjusting the fibrous layer, such forms as the card web, the air-laid web and the wet type paper making web, the fiber neither melting nor softening at 120° C. or less may use the short fiber with the generally used length.

The cross-sectional shape of the fiber neither melting nor softening at 120° C. or less is not particularly limited, and may be exemplified: such as a circular shape, a flat shape, a heteromorphic shape, and a hollow shape. When the cross-sectional shape of the fiber neither melting nor softening at 120° C. or less is the circular shape, the fiber diameter thereof preferentially ranges from greater than 5 μm to 50 μm or less.

As far as the strength of the laminated non-woven fabric, and that the heat directly applied to the fibrous layer A is sufficiently diffused to the fibrous layer B during the point thermal compression bonding are concerned, and additionally, particularly as far as the impregnated amount (liquid preservation amount) of the liquid component during the use for impregnated liquid is concerned, the unit area mass of the fibrous layer A obtained by using the fiber neither melting nor softening at 120° C. or less preferentially ranges from 5 g/to 95 g/m², and more preferentially from 10 g/m² to 50 g/m². When the unit area mass of the non-woven fabric layer obtained by using the fiber neither melting nor softening at 120° C. or less is large, the machining temperature is increased during the point thermal compression bonding, and when the unit area mass is small, the machining temperature is constrained to be low, so that the correspondence may be performed.

In the range without hindering the effects of the present invention, the fiber neither melting nor softening at 120° C. or less used for the present invention may also be added with a stabilizing agent, a flame retardant, an antibacterial agent, a coloring agent, a lubricant, a photostabilizer, a hydrophilizing agent, an antistatic agent, and a charged agent. Additionally, the attachment treatment of the surfactant may also be performed on the laminated non-woven fabric of the present invention as required.

The method for manufacturing the fibrous layer B obtained by using the fiber melting or softening at 120° C. or less is not particularly limited. The method may be for example: a method for obtaining a short fiber such as a staple fiber or chopped fiber, and a method for obtaining a long fiber such as the melt-blown process, the spun-bond process, and the tow opening process.

The fibrous layer B obtained by using the fiber melting or softening at 120° C. or less includes one or more type of fiber melting or softening 120° C. or less. As regards the melting point or softening point of the fiber melting or softening at 120° C. or less within the fibrous layer B, when the fiber has the melting point, the fiber having the melting point with the lower limit of 40° C. may be selected, and when the fiber has the softening point, the fiber having the softening point with the lower limit of 20° C. may be selected. In these cases, the lower limits of both the melting point and the softening point are preferentially 45° C. The fibrous layer B preferentially includes at least two types of fibers of the fiber melting or softening at 120° C. or less and the fiber with the melting point or softening point different from that of the foregoing fiber by mixing, and more preferentially includes at least two types of fibers by mixing, in which both of the two are the fiber melting or softening at 120° C. or less and the melting points or softening points of the both are different. When the fibrous layer B includes two types of fibers, the melting point or softening point difference between such two types of fibers preferentially ranges from 2° C. to 80° C., and more preferentially ranges from 2° C. to 50° C. in a case that the fiber with the lowest melting point or softening point in the fiber included by the fibrous layer B has a melting point. The melting point or softening point difference preferentially ranges from 2° C. to 100° C., and more preferentially ranges from 2° C. to 50° C. in a case that the fiber with the lowest melting point or softening point in the fiber included by the fibrous layer B has a softening point. When the fibrous layer B includes three or more types of fibers melting or softening at 120° C. or less, the melting point or softening point difference between the fiber with the highest melting point or softening point and the fiber with the lowest melting point or softening point preferentially ranges from 2° C. to 80° C. in a case of showing that the fiber with the lowest melting point or softening point has a melting point, preferentially ranges from 2° C. to 100° C. in a case of showing that the fiber with the lowest melting point or softening point has a softening point, and more preferentially ranges from 2° C. to 50° C. in any case. If the melting point or softening point difference ranges from 2° C. to 100° C., in the fibrous layer B, the extent of the inter-fiber melting deformation or softening deformation may vary, and it is easy to ensure inter-fiber gap in the fibrous layer B through the fiber with smaller melting deformation or softening deformation, so that the tender hand feeling, the liquid preservation property or the gas permeability may be guaranteed. In order to enable the fibrous layer B to obtain the functions expected by the present invention, preferentially the fibrous layer B includes the fiber melting or softening at 120° C. or less of at least 5 mass %, and more preferentially at least 20 mass %.

The type of the fiber melting or softening at 120° C. or less is not particularly limited, and may be one satisfying the heat property condition and selected from an elastomer, polyvinyl chloride, low density PE, an acrylic resin, or polyvinyl acetate. Generally, because the elastomer component itself has the adhesiveness, the fiber is the elastomer fiber, in addition to adding the softening bonding force, the adhesive force is added so that the laminated layers are integrated and become firmer, preferentially the fibrous layer B obtained by using the fiber melting or softening at 120° C. or less is an elastomer fibrous layer.

Through the integration formed by such firm joint, the laminated non-woven fabric may be provided, which breaks difficulty even if being stretched greatly.

The elastomer resin used for the elastomer fiber may be selected from a styrene elastomer, an olefin elastomer, an ester elastomer, a urethane elastomer, an amide elastomer or a mixture thereof to become the fiber melting or softening at 120° C. or less. Particularly, when the elastomer resin is used for the impregnated liquid, as far as the wearing feeling of the softness or stretchability of the laminated non-woven fabric along with the liquid component impregnation or the wearing stability along with the stretchability is concerned, the styrene elastomer, the olefin elastomer, and the urethane elastomer are preferential.

Additionally, the fiber forming the fibrous layer obtained by using the fiber melting or softening at 120° C. or less may also be formed by mixing two or more types of elastomer fibers with different melting points or softening points. In a case that the fibrous layer is formed by mixing two types of fibers with different softening points, the fiber with the high softening point may exist in the layer without largely damaging the fiber form thereof, so as to ensure the space volume in the non-woven fabric, and facilitate improving the air permeability or fluffiness, thereby improving the maintenance amount when the liquid component is impregnated.

For example, the following may be exemplified: mixing of 1 mass % to 99 mass % of the styrene elastomer fiber and 99 mass % to 1 mass % of the olefin elastomer fiber, mixing of 1 mass % to 99 mass % of the urethane elastomer fiber and 99 mass % to 1 mass % of the olefin elastomer fiber, and mixing of 1 mass % to 99 mass % of the olefin elastomer fiber and 99 mass % to 1 mass % of another olefin elastomer fiber. For example, the specific mixing form of two types of olefin elastomer fibers may be exemplified as follows: mixing of the Polypropylene (PP) elastomer fiber and another PP elastomer fiber, mixing of the PP elastomer fiber and the Polyethylene (PE) elastomer fiber, and mixing of the PE elastomer fiber and another PE elastomer fiber. By types or mass ratios of the elastomer fibers to be mixed, the air permeability or fluffiness, and the stretchability may be adjusted into an expected range at a high level, particularly in a case of using the impregnated liquid, the wearing feeling of the softness or stretchability of the laminated non-woven fabric along with the liquid component impregnation and the wearing stability along with the stretchability may be adjusted into the expected range at a high level.

Additionally, as long as the effects of the present invention are not damaged, the fibrous layer B may also use fiber formed by mixing the resin melting or softening at 120° C. or less and another resin at any mixing ratio.

In the present invention, the fiber diameter of the fiber melting or softening at 120° C. or less is not particularly limited, and the ultrafine long fiber with the fiber diameter of 15 μm or less is preferential. More preferentially, the fiber diameter is 10 μm or less. If the fiber diameter is 10 μm or less, the heat conducted across the external layer may efficiently be used for the fiber softening of the fibrous layer, so such fiber diameter is preferential. Additionally, when the fiber is used for the impregnated liquid, the wearing feeling for skin becomes more excellent in a humid state, so the above fiber diameter is preferential. When the fiber melting or softening at 120° C. or less is the ultrafine long fiber, the lower limit of the fiber diameter is not particularly specified, and is about 0.5 μm if the ordinary manufacturing process generally performed on the ultrafine long fiber is considered.

In the present invention, the mass per unit area of the fibrous layer B of the laminated non-woven fabric is not particularly limited, and preferentially ranges from 3 grams/square meter (g/m²) to 200 g/m² from the viewpoint of processability. More preferentially, the mass per unit area ranges from 5 g/m² to 100 g/m². When the mass per unit area of the fibrous layer B is small, the treatment of increasing the machining temperature during the point thermal compression bonding or increasing the pressure is performed, so that the laminated non-woven fabric having the sufficient interlayer peeling strength may be fabricated.

In the range without hindering the effects of the present invention, the fiber (resin) forming the fibrous layer B may also be added with a stabilizing agent, a flame retardant, an antibacterial agent, a coloring agent, a lubricant, a photostabilizer, a hydrophilizing agent, an antistatic agent, and a charged agent.

In the present invention, the laminated non-woven fabric has the fiber neither melting nor softening at 120° C. or less in an external layer and has the fiber melting or softening at 120° C. or less in an interlayer, so the welding and the winding for the embossing roll are not generated during the point thermal compression bonding, and therefore, the machining temperature may be set to be high. Therefore, the interlayer peeling strength exerts excellent performance. Previously, when the area ratio of the point thermal compression bonding portion is reduced, the pressure of the point thermal compression bonding must be increased, but if the pressure is increased, although the interlayer peeling strength is strengthened, the embossment part becomes crisp. In the laminated non-woven fabric of the present invention, by increasing the machining temperature, even if the area ratio of the point thermal compression bonding portion is low, the sufficient interlayer peeling strength may also be obtained, so as to obtain the laminated non-woven fabric with the high tensile strength.

In the present invention, the interlayer peeling strength between the fibrous layer A and the fibrous layer B of the laminated non-woven fabric is preferentially 0.3 N/25 mm or more, and more preferentially 0.5 N/25 mm or more. If the interlayer peeling strength is 0.3 N/25 mm or more, even if the fiber is used for the impregnated liquid, peeling occurs uneasily. Because it is difficult to perform the interlayer peeling, the fluff generation is constrained. Additionally, the sufficient interlayer peeling strength is preferential, but by setting the interlayer peeling strength to be 4.0 N/25 mm or less, the effect of maintaining the hand feeling tender may be obtained.

In the laminated non-woven fabric of the present invention, the bi-layered fibrous layer A obtained by using the fiber neither melting nor softening at 120° C. or less and the fibrous layer B obtained by using the fiber melting or softening at 120° C. or less are laminated integrally through the point thermal compression bonding.

When the laminated non-woven fabric of the present invention is manufactured, the reason for selecting the point thermal compression bonding process as the method for performing integration is that the point thermal compression bonding process has advantages as follows: compared with the hot air treatment process, the point thermal compression bonding method is a method utilizing the heat and the pressure, so the method using the point thermal compression bonding machine can be performed at the temperature lower than the melting point or softening point of the resin to be welded. That is, when the laminated integration is performed through the point thermal compression bonding, the damage to the fibrous layer A may be constrained during the point thermal compression bonding, and the bonding force of the fibrous layer B may be sufficiently exerted, so the point thermal compression bonding process is the most preferential.

In the present invention, during the manufacturing of the laminated non-woven fabric, the point thermal compression bonding is not particularly limited, and the point thermal compression bonding is preferably performed by using the roll surface to be engraved into a heating roll in the concave and convex shape (sometimes referred to as "heating embossing roll" hereinafter). In the present invention, the point thermal compression bonding using the embossing roll is performed by compression bonding the heat embossing roll to the surface of the laminated non-woven fabric. At this time, the surface of the laminated non-woven fabric exposed on the other surface of the laminated non-woven fabric, that is, the surface at the other side of the laminated non-woven fabric is in contact with a roll which may be heated and have the surface engraved into the smooth shape or concave and convex shape to perform the point thermal compression bonding. In the present invention, the surface of the fibrous layer A exposed on a surface of the laminated non-woven fabric form is the discontinuous and regular concave and convex shape result from the point thermal compression bonding. On the other hand, preferentially the surface of the laminated non-woven fabric exposed on the other surface of the laminated non-woven fabric forms the smooth surface generated because of being in contact with the smoothing roll.

In the laminated non-woven fabric of the present invention, the total area ratio (the area ratio of the point thermal compression bonding portion, and sometimes referred to as "compression bonding area ratio" hereinafter) of concave parts located on the surface of the fibrous layer A exposed on a surface of the non-woven fabric result from the point thermal compression bonding to the surface of the fibrous layer A is not particularly limited, but preferentially ranges from 2% to 40%, and more preferentially 3% to 30%.

If the compression bonding area ratio is 2% or more, the sufficient interlayer peeling strength and non-woven fabric strength may be obtained, and additionally, the fluff is also constrained. Additionally, if the compression bonding area ratio is 40% or less, the hand feeling of the non-woven fabric is also maintained tender in a state of sufficiently maintaining the interlayer peeling strength or the non-woven fabric strength. Additionally, the surface of the fibrous layer A is exposed on the other face of the laminated non-woven fabric, the total area ratio (the compression bonding area ratio) of the discontinuous and regular concave shape formed result from the point thermal compression bonding occupied in the fibrous layer A may also range from 2% to 40%.

In the present invention, the fiber melting or softening at 120° C. or less is used as the fiber forming the fibrous layer B; particularly, the fiber is the elastomer fiber, additionally, the fiber is the ultrafine long fiber, and the inter-fiber joint force of the point thermal compression bonding portion along with melting or softening of the fiber of the fibrous layer B is strengthened and the interlayer peeling resistance may be increased, so relatively, the total area ratio of the point thermal compression bonding portion occupied on the surface of the laminated non-woven fabric may be reduced; for example, the compression bonding area ratio may be set to be from 2% to 30%, and may be further set to be from 2% to 25%. Therefore, the laminated non-woven fabric having more tender hand feeling may be obtained. Additionally, it is ensured that correspondingly the non-compression bond portion occupied a wide area in the laminated non-woven fabric, so the amount of the inter-fiber gap in the laminated non-woven fabric is maintained high, thereby becoming the non-woven fabric with high liquid preservation amount or gas permeability.

In the present invention, the laminated non-woven fabric has the two fibrous layer A obtained by using the fiber neither melting nor softening at 120° C. or less as external layers, so that the temperature during the point thermal compression bonding can be increased. The melting point or softening point of the resin of the fibrous layer B located in the internal layer is lower than that of the resin of the fibrous layer A located as the external layers, so that when the point thermal compression bonding machining is performed, the machining can be performed at the temperature higher than the softening point of the resin of the fibrous layer B. Therefore, the fibrous layer A located on the surface is uneasily subject to excessive damage caused by the heat, and the welding (winding) of the resin for the embossing roll is constrained.

The shape of the projection of the embossing roll used in the present invention may use various shapes formed by engraving. For example, the shape of the surface of distal portion of the projection is in various shapes such as a circular shape, an oval shape, a square, a rectangle, a parallelogram, a rhombus, a triangle, and a hexagon.

In the laminated non-woven fabric of the present invention, in the thickness direction of the non-woven fabric onto which the projection of the embossing roll is pressed, at least the fiber melting or softening at 120° C. or less in the fibrous layer B is jointed with the fiber forming the fibrous layer A through the melting or softening thereof, so that the fibrous layer and the fibrous layer are integrated. The pressure and the temperature during the point thermal compression bonding may be properly selected on the condition that the fibrous layer A and the fibrous layer B are integrated through the melting or softening of the fiber melting or softening at 120° C. or less in the fibrous layer B, but preferentially the pressure during the point thermal compression bonding ranges from 0.490 megapascal (MPa) to 9.80 MPa (5 kilogram-forces/square centimeter (Kgf/cm$^2$) to 100 Kgf/cm$^2$), and the temperature during the thermal compression bonding ranges from 50° C. to 150° C.; the pressure and the temperature are not particularly limited as long as the jointing form is formed between the fibrous layer A and the fibrous layer B, and the range of sufficient interlayer peeling strength may be obtained.

In the present invention, on the condition of the temperature at which the fiber melting or softening at 120° C. or less forming the fibrous layer B in the laminated non-woven fabric melts or softens, the temperature of the laminated non-woven fabric during the point thermal compression bonding preferentially ranges from 50° C. to 150° C. Furthermore, the temperature more preferentially ranges from 50° C. to 150° C., and is higher by 10° C. or more even higher by 15° C. or more than the softening point of the resin with the lowest softening point in the fibrous layer B. Otherwise the temperature more preferentially ranges from 50° C. to 150° C., and is not lower than the temperature which is lower by 15° C. than the melting point of the resin with the lowest melting point. Additionally, the upper limit is preferentially about 150° C., and when the fibrous layer A includes the fiber melting or softening at 150° C. or less, the treatment can be performed at the temperature without generating the welding for the embossing roll, so that the laminated non-woven fabric may be fabricated.

The laminated non-woven fabric of the present invention may be preferably used for the absorptive article, the fiber manufactured article such as the wiper, and the cosmetic sheet material. The laminated non-woven fabric as the absorptive article may be preferably used for the raw material of hygienic materials such as the baby or adult disposable diaper, the sanitary towel, the sweat absorbing pad, the sebum removing sheet material, and the hand towel.

The laminated non-woven fabric as the wiper may be preferably used as the raw material of part of or the whole of the household disposable wiping cloth, the window cleaning material, the floor mopping material, and the "tatami" wiping material. Moreover, the laminated non-woven fabric may also be used as the disposable seat cover in the airplane or coach, the disposable close stool cushion, the insulating riser of clothes, and the imitation substrate.

Particularly, by using the hydrophilic fiber in the fibrous layer A, the laminated non-woven fabric may ensure sufficient liquid preservation amount, so as to be more suitably used for impregnating the liquid. For example, the laminated non-woven fabric as the cosmetic sheet material is suitable for attaching the impregnated material such as the cosmetic material and the medicine liquid to all parts of the human body, such as the entire face, the nose, the canthus, the mouth, the neck, the upper arm, the hand, the hand finger, the waist, the belly, the thigh, the calf, the knee, and the ankle, and specifically, may be used for the face mask. Moreover, by effectively utilizing the characteristics of the laminated non-woven fabric of the present invention, the laminated non-woven fabric may be preferably used for the stretchable element for the hygienic material such as the stretchable element for the disposable diaper, the stretchable element for the diaper, the stretchable element for the menstrual article, the stretchable element for the disposable underpants, the stretchable element for the diaper cover; the stretchable belt, the adhesive plaster, the bandage, the protective equipment, the sack, and the stretchable element for cloth, and besides, may be preferably used for the base fabric of the wet cloth material, the base fabric of the plaster material, and the base fabric of the non-slip article.

EXAMPLE

Hereinafter, the content of the present invention is illustrated through examples, but the present invention is not limited to these examples.

Hereinafter, the definition and the determination method of various physical properties consulted by the laminated non-woven fabric manufactured in the examples and comparative examples are recorded.

Furthermore, in the following illustration, the so-called "MD" refers to a direction consistent with the length direction of the fiber, forming the non-woven fabric of the used non-woven fabric layer, arranged in a direction, and the so-called "CD" refers to the perpendicular direction relative to the length direction of the fiber.

(1) Average Fiber Diameter

A Scanning Electron Microscope (SEM) is used to shoot an enlarged picture of the surface of the non-woven fabric, then diameters of 100 pieces of fibers are determined, and their arithmetic average value is used as the average fiber diameter.

(2) Area Ratio of the Point Thermal Compression Bonding Portion (the Compression Bonding Area Ratio)

The SEM is used to shoot an enlarged picture of the surface of the non-woven fabric, and the proportion of the area of the compression bond point occupied in each unit compression bonding pattern is used as the compression bonding area ratio.

Compression bonding area ratio (%)=(area of a compression bond point in the unit compression bond pattern/area of the unit compression bond pattern)×100

(3) Breaking Strength of the Laminated Non-Woven Fabric

The determination is performed according to JIS L1906 "cloth experiment method of woven fabric and knitted fabric". The experiment sheet with the width of 25 mm and the length of 150 mm is fabricated. The experiment sheet prepares two experiment sheets included in the sheet material, which is an experiment sheet fabricated by cutting in a manner that the length direction of the experiment sheet is consistent with the length direction (MD direction) of the fiber arranged in a direction and forming the fibrous layer A, and an experiment sheet fabricated by cutting in a manner that the length direction of the experiment sheet is consistent with the direction (CD direction) which is perpendicular to the MD direction. A tensile experiment machine Autograph AG-X (commodity name, manufactured by SHIMADZU CORPORATION) is used to set the clamping head gap as 100 mm to fix the experiment sheet. The experiment sheet is elongated at the tensile speed of 200 mm/minute until it is broken, and the largest strength and the largest elongation are used respectively as the break strength and the break elongation.

(4) Mass Per Unit Area

The determination is performed according to JIS L1906 "cloth experiment method of woven fabric and knitted fabric". Experiment sheets with the size of 15 cm×15 cm are cut from any two portions of the non-woven fabric, an electronic balance is utilized to determine weights of the experiment sheets, and the average value of the weights is converted into the mass of 1 m$^2$ to serve as the mass per unit area.

(5) Interlayer Peeling Strength

In the present invention, the following method is utilized to determine the interlayer peeling strength between the fibrous layer A and the fibrous layer B. The experiment sheet with the width of 25 mm and the length of 150 mm is fabricated. The experiment sheet prepares two experiment sheets included in the sheet material, which is an experiment sheet fabricated by cutting in a manner that the length direction of the experiment sheet is consistent with the length direction (MD direction) of the fiber arranged in a direction and forming the fibrous layer A, and an experiment sheet fabricated by cutting in a manner that the length direction of the experiment sheet is consistent with the direction (CD direction) which is perpendicular to the MD direction. "Cellotape (registered trademark)" No. 252 (the adhesive force being 3.10 N/10 mm) with the width of 24 mm manufactured by SEKISUI corporation is utilized to attach a piece of paper with the width of 25 mm and the length of 50 mm to both sides of the fibrous layer A of each experiment sheet, and then a certain load is applied, so that an experiment sample is manufactured. A tensile experiment machine Autograph AG-X (commodity name, manufactured by SHIMADZU CORPORATION) is used to set the clamping head gap as 50 mm to fix the experiment sheet. The fibrous layer A at a side peeling off at the tensile speed of 100 mm/minute and the bonding surface of the fibrous layer B are peeled, and the largest point load is determined and is used as the interlayer peeling strength of the laminated non-woven fabric. Furthermore, in the peeling strength experiment method performed in the examples and the comparative examples, for all experiment sheets, the fibrous layer A at a side (a side which peels off) and the bonding surface of the fibrous layer B are peeled, and the bonding surface at the other side thereof is maintained in a bonding state.

(6) Softening Point

In the present invention, the softening point is set as the peak temperature obtained by utilizing the thermal stress-temperature curve of Thermo Mechanical Analysis (TMA). Specifically a TMA device (such as, the TMA (type SS120) manufactured by Seiko Instruments corporation) is used, the determination mode is set as the tensile determination L control mode, the initial length of the sample is set as 20 mm, and the sample is elongated by 0.5% and then is determined. The heating-up speed is set as 20° C./minute.

(7) Melting Point

In the present invention, the melting point is determined by utilizing a Differential Scanning calorimeter (DSC) on the condition that the sample is 5 mg and the heating-up speed is 10° C./min according to JIS K7122.

The abbreviation and the content of the raw material resins used in the present invention in the following table are as follows.

- A: ethylene-octene copolymer, EG8401 ((commodity name), manufactured by Dow Chemical, melting point: 76° C.)
- B: ethylene-octene copolymer, EG8402 ((commodity name), manufactured by Dow Chemical, melting point: 100° C.)
- C: propylene-ethylene copolymer, VM2125 ((commodity name), manufactured by Exxon Mobil, melting point: 52° C.)
- D: styrene-ethylene-buthylene-styrene block copolymer, Tuftec H1031 ((commodity name), manufactured by Asahi Kasei Chemicals, melting point: 69° C.)
- E: low density PE, Petrothene PE202 ((commodity name), manufactured by Tosoh, melting point: 82° C.)

Example 1

In the fibrous layer B, B and C are used as the raw material resins, and the following devices and methods are utilized to manufacture the melt-blown non-woven fabric. A melt-blown device uses: two extruders including screw rods (diameter being 50 mm), heating members and gear pumps; a spinneret for the mixed fiber (aperture being 0.3 mm, spinneret orifices spurting fibers of different components are alternately arranged into a row, the orifice number being 501, and the effective width being 500 mm), a compressed air generating device, an air heater, a trapping conveyor equipped with a net made of polyester, and a winder. B and C are respectively plunged into each extruder, a heating member is utilized to make B and C respectively be heated and melt at 250° C., and the gear pump is set in a manner that the ratio (mass %) of B/C becomes 50/50; then B and C are spurted at the spinning speed of 0.3 g/minute from each single orifice of the spinneret, and pass through the compressed air heated to 400° C. at 60 kilopascals (kPa) (gauge pressure), and the spurted fiber is blown onto the trapping conveyor of the net made of polyester moving at the moving speed of 16 m/minute, so as to obtain the mixed fiber melt-blown non-woven fabric with the mass per unit area of 20 g/m$^2$ formed by randomly accumulating the fiber. The trapping conveyor is disposed at a distance of 19.5 cm from the spinneret. The blown air is removed through a suction device disposed at the back side of the trapping conveyor.

The fibrous layer A uses the rayon with the fiber length of 51 mm and the pulp with the fiber length of 7 mm to form the spunlaced non-woven fabric of rayon/pulp/rayon (laminated fibrous layer with the mass ratio of 25/50/25) with the mass per unit area of 40 g/m$^2$ which has the elongation in the direction perpendicular to the direction in which the fiber is arranged in a direction, and the mixed fiber melt-blown non-woven fabric (the fibrous layer B) is laminated thereon. Therefore, the same fibrous layer A is superimposed on the fibrous layer B, so as to obtain a laminated object of fibrous layer A/fibrous layer B/fibrous layer A. A point bonding finishing machine having an engraving roll with the surface engraved with the concave and convex embossing and a smoothing roll is utilized to perform partial thermal compression bonding on the laminated object at the temperature of 110° C. and the pressure of 1.96 MPa (20 Kgf/cm$^2$). Furthermore, the area ratio of the projection of the engraving roll is 25%, and the surface of distal portion of the projection is the rhombus shape. The physical properties of the laminated non-woven fabric are shown in Table 1.

The obtained laminated non-woven fabric has sufficient interlayer peeling strength, and the fluff peeled between the layers is not observed.

Example 2

In the fibrous layer B, A and B are used as the raw material resins, and the following devices and methods are utilized to manufacture the melt-blown non-woven fabric. A melt-blown device uses: two extruders including screw rods (diameter being 50 mm), heating members and gear pumps; a spinneret for the mixed fiber (aperture being 0.3 mm, spinneret orifices spurting fibers of different components are alternately arranged into a row, the orifice number being 501, and the effective width being 500 mm), a compressed air generating device, an air heater, a trapping conveyor equipped with a net made of polyester, and a winder. A and B are respectively plunged into each extruder, a heating member is utilized to make A and B respectively be heated and melt at 300° C., and the gear pump is set in a manner that the ratio (mass %) of A/B becomes 50/50; then A and B are spurted at the spinning speed of 0.3 g/minute from each single orifice of the spinneret, and pass through the compressed air heated to 400° C. at 94 kPa (gauge pressure), and the spurted fiber is blown onto the trapping conveyor of the net made of polyester moving at the moving speed of 18 m/minute, so as to obtain the mixed fiber melt-blown non-woven fabric with the mass per unit area of 20 g/m$^2$ formed by randomly accumulating the fiber. The trapping conveyor is disposed at a distance of 19.5 cm from the spinneret. The blown air is removed through a suction device disposed at the back side of the trapping conveyor.

The fibrous layer A uses the cellulose long fiber non-woven fabric, Bemliese ((commodity name), manufactured by Asahi Kasei Fibers, cuprammonium 100%), and the mixed fiber melt-blown non-woven fabric (the fibrous layer B) is laminated thereon. Therefore, the same fibrous layer A is superimposed on the fibrous layer B, so as to obtain a laminated object of fibrous layer A/fibrous layer B/fibrous layer A. A point bonding finishing machine having an engraving roll with the surface engraved with the concave and convex embossing and a smoothing roll is utilized to perform partial thermal compression bonding on the laminated object at the temperature of 80° C. and the pressure of 1.96 MPa (20 Kgf/cm$^2$). Furthermore, the area ratio of the projection of the engraving roll is 4%, and the surface of distal portion of the projection is the rhombus shape. The physical properties of the laminated non-woven fabric are shown in Table 1.

The obtained laminated non-woven fabric has sufficient interlayer peeling strength, and the fluff peeled between the layers is not observed.

Example 3

The fibrous layer B uses the mixed fiber melt-blown non-woven fabric according to Example 2.

The fibrous layer A uses the spunlaced non-woven fabric used in Example 1, and the mixed fiber melt-blown non-woven fabric (the fibrous layer B) is laminated thereon. Therefore, the same fibrous layer A is superimposed on the fibrous layer B, so as to obtain a laminated object of fibrous layer A/fibrous layer B/fibrous layer A. A point bonding finishing machine having an engraving roll with the surface engraved with the concave and convex embossing and a smoothing roll is utilized to perform partial thermal compression bonding on the laminated object at the temperature of 100° C. and the pressure of 1.96 MPa (20 Kgf/cm$^2$). Furthermore, the area ratio of the projection of the engraving roll is 4%, and the surface of distal portion of the projection is the circular shape. The physical properties of the laminated non-woven fabric are shown in Table 1.

The obtained laminated non-woven fabric has sufficient interlayer peeling strength, and the fluff peeled between the layers is not observed.

Example 4

In the fibrous layer B, A and B are used as the raw material resins, and the following devices and methods are utilized to manufacture the melt-blown non-woven fabric. A melt-blown device uses: two extruders including screw rods (diameter being 50 mm), heating members and gear pumps; a spinneret for the mixed fiber (aperture being 0.3 mm, spinneret orifices spurting fibers of different components are alternately arranged into a row, the orifice number being 501, and the effective width being 500 mm), a compressed air generating device, an air heater, a trapping conveyor equipped with a net made of polyester, and a winder. A and B are respectively plunged into each extruder, a heating member is utilized to make A and B respectively be heated and melt at 300° C., and the gear pump is set in a manner that the ratio (mass %) of A/B becomes 50/50; then A and B are spurted at the spinning speed of 0.3 g/minute from each single orifice of the spinneret, and pass through the compressed air heated to 400° C. at 94 kPa (gauge pressure), and the spurted fiber is blown onto the trapping conveyor of the net made of polyester moving at the moving speed of 32 m/minute, so as to obtain the mixed fiber melt-blown non-woven fabric with the mass per unit area of 10 g/m$^2$ formed by randomly accumulating the fiber. The trapping conveyor is disposed at a distance of 19.5 cm from the spinneret. The blown air is removed through a suction device disposed at the back side of the trapping conveyor.

The fibrous layer A uses the spunlaced non-woven fabric used in Example 1, and the mixed fiber melt-blown non-woven fabric (the fibrous layer B) is laminated thereon. Therefore, the same fibrous layer A is superimposed on the fibrous layer B, so as to obtain a laminated object of fibrous layer A/fibrous layer B/fibrous layer A. A point bonding finishing machine having an engraving roll with the surface engraved with the concave and convex embossing and a smoothing roll is utilized to perform local thermal compression bonding on the laminated object at the temperature of 100° C. and the pressure of 1.96 MPa (20 Kgf/cm$^2$). Furthermore, the area ratio of the projection of the engraving roll is 4%, and the surface of distal portion of the projection is the circular shape. The physical properties of the laminated non-woven fabric are shown in Table 1.

The obtained laminated non-woven fabric has sufficient interlayer peeling strength, and the fluff peeled between the layers is not observed.

The laminated non-woven fabric obtained in Example 4 is cut into a face mask shape, and then an amount of moisture preserving cosmetic water making the sheet material sufficiently be immersed is impregnated in the formed sheet material by cutting. Ten face masks are prepared, and then are worn over faces of ten tryout persons for 10 minutes, so as to evaluate the wearing stability, such as the sealing connection, the dryness, the skin tightness. As a result, any tryout person obtains good wearing stability.

Example 5

The mixed fiber melt-blown non-woven fabric according to Example 2 is used in the fibrous layer B.

The fibrous layer A uses the spunlaced non-woven fabric including the rayon with the mass per unit area of 30 g/m$^2$ which has the elongation in the direction perpendicular to the direction in which the fiber is arranged in a direction, and the mixed fiber melt-blown non-woven fabric (the fibrous layer B) is laminated thereon. Therefore, the same fibrous layer A is superimposed on the fibrous layer B, so as to obtain a laminated object of fibrous layer A/fibrous layer B/fibrous layer A. A point bonding finishing machine having an engraving roll with the surface engraved with the concave and convex embossing and a smoothing roll is utilized to perform partial thermal compression bonding on the laminated object at the temperature of 130° C. and the pressure of 1.96 MPa (20 Kgf/cm$^2$). Furthermore, the area ratio of the projection of the engraving roll is 4%, and the surface of distal portion of the projection is the circular shape. The physical properties of the laminated non-woven fabric are shown in Table 1.

The obtained laminated non-woven fabric has sufficient interlayer peeling strength, and the fluff peeled between the layers is not observed.

Example 6

The mixed fiber melt-blown non-woven fabric according to Example 2 is used in the fibrous layer B.

The fibrous layer A uses the spunlaced non-woven fabric including rayon/polyester/PP (laminated fibrous layer with the mass ratio of 48/50/2) with the mass per unit area of 38 g/m$^2$ which has the elongation in the direction perpendicular to the direction in which the fiber is arranged in a direction, and the mixed fiber melt-blown non-woven fabric (the fibrous layer B) is laminated thereon. The melting point of the used polyester is 237° C., and the melting point of the PP is 148° C. Therefore, the same fibrous layer A is superimposed on the fibrous layer B, so as to obtain a laminated object of fibrous layer A/fibrous layer B/fibrous layer A. A point bonding finishing machine having an engraving roll with the surface engraved with the concave and convex embossing and a smoothing roll is utilized to perform partial thermal compression bonding on the laminated object at the temperature of 100° C. and the pressure of 1.96 MPa (20 Kgf/cm$^2$). Furthermore, the area ratio of the projection of the engraving roll is 4%, and the surface of distal portion of the projection is the circular shape. The physical properties of the laminated non-woven fabric are shown in Table 1.

The obtained laminated non-woven fabric has sufficient interlayer peeling strength, and the fluff peeled between the layers is not observed.

Example 7

The mixed fiber melt-blown non-woven fabric according to Example 2 is used in the fibrous layer B.

The fibrous layer A uses the facial tissue base paper including the pulp with the mass per unit area of 12.5 g/m$^2$ which has the elongation in the direction perpendicular to the direction in which the fiber is arranged in a direction, and the mixed fiber melt-blown non-woven fabric (the fibrous layer B) is laminated thereon. Therefore, the same fibrous layer A is superimposed on the fibrous layer B, so as to obtain a laminated object of fibrous layer A/fibrous layer B/fibrous layer A. A point bonding finishing machine having an engraving roll with the surface engraved with the concave and convex embossing and a smoothing roll is utilized to perform partial thermal compression bonding on the laminated object at the temperature of 120° C. and the pressure of 1.96 MPa (20 Kgf/cm$^2$). Furthermore, the area ratio of the projection of the engraving roll is 4%, and the surface of distal portion of the projection is the circular shape. The physical properties of the laminated non-woven fabric are shown in Table 1.

The obtained laminated non-woven fabric has sufficient interlayer peeling strength, and the fluff peeled between the layers is not observed.

Example 8

In the fibrous layer B, D is used as the raw material resins, and the following devices and methods are utilized to manufacture the melt-blown non-woven fabric. A melt-blown device uses: two extruders including screw rods (diameter being 50 mm), heating members and gear pumps; a spinneret for the mixed fiber (aperture being 0.3 mm, spinneret orifices spurting fibers of different components are alternately arranged into a row, the orifice number being 501, and the effective width being 500 mm), a compressed air generating device, an air heater, a trapping conveyor equipped with a net made of polyester, and a winder. D is plunged into each extruder, and a heating member is utilized to make D in the extruder be heated and melt at 250° C.; then D is spurted at the spinning speed of 0.3 g/minute from each single orifice of the spinneret, and passes through the compressed air heated to 400° C. at 60 kPa (gauge pressure), and the spurted fiber is blown onto the trapping conveyor of the net made of polyester moving at the moving speed of 3.8 m/minute, so as to obtain the mixed fiber melt-blown non-woven fabric with the mass per unit area of 100 g/m$^2$ formed by randomly accumulating the fiber. The trapping conveyor is disposed at a distance of 19.5 cm from the spinneret. The blown air is removed through a suction device disposed at the back side of the trapping conveyor.

The fibrous layer A uses the spunlaced non-woven fabric used in Example 1, and the mixed fiber melt-blown non-woven fabric (the fibrous layer B) is laminated thereon. Therefore, the mixed fiber melt-blown non-woven fabric is laminated thereon. Therefore, the same fibrous layer A is superimposed on the fibrous layer B, so as to obtain a laminated object of fibrous layer A/fibrous layer B/fibrous layer A. A point bonding finishing machine having an engraving roll with the surface engraved with the concave and convex embossing and a smoothing roll is utilized to perform partial thermal compression bonding on the laminated object at the temperature of 110° C. and the pressure of 1.96 MPa (20 Kgf/cm$^2$). Furthermore, the area ratio of the projection of the engraving roll is 4%, and the surface of distal portion of the projection is the circular shape. The physical properties of the laminated non-woven fabric are shown in Table 1.

The obtained laminated non-woven fabric has sufficient interlayer peeling strength, and the fluff peeled between the layers is not observed.

Example 9

The spunlaced non-woven fabric according to Example 1 is used in the fibrous layer A, and the spun-bond non-woven fabric with E as the raw material and with the mass per unit area of 30 g/m$^2$ is used as the fibrous layer B and is laminated thereon. Therefore, the same fibrous layer A is superimposed on the fibrous layer B, so as to obtain a laminated object of fibrous layer A/fibrous layer B/fibrous layer A. A point bonding finishing machine having an engraving roll with the surface engraved with the concave and convex embossing and a smoothing roll is utilized to perform partial thermal compression bonding on the laminated object at the temperature of 130° C. and the pressure of 1.96 MPa (20 Kgf/cm$^2$). Furthermore, the area ratio of the projection of the engraving roll is 4%, and the surface of distal portion of the projection is the circular shape. The physical properties of the laminated non-woven fabric are shown in Table 2.

The obtained laminated non-woven fabric has sufficient interlayer peeling strength, and the fluff peeled between the layers is not observed.

Example 10

The fibrous layer A adopts the point bonding non-woven fabric of the conjugate fiber using a core-sheath construction with the weight ratio of PP to co-PP being 60:40. A spinning device including an extruder having a screw rod (diameter being 30 mm), a heating member and a gear pump; a spinneret (aperture being 0.6 mm, and the orifice number being 500); a silk guiding roll; and a winder is utilized, and further, a heat roll extension device is utilized to prepare the short fiber of 2.2 dtex and with the length of 38 mm. Subsequently, a carding machine is utilized to comb the obtained short fiber so as to manufacture a web, and then a point bonding finishing machine is utilized to perform heat treatment on the web at the temperature of 124° C., so as to obtain the point bonding non-woven fabric. The melting point of the used PP is 160° C., and the melting point of the co-PP is 134° C.

The mixed fiber melt-blown non-woven fabric according to Example 2 is used as the fibrous layer B and laminated on the fibrous layer A. Therefore, the same fibrous layer A is superimposed on the fibrous layer B, so as to obtain a laminated object of fibrous layer A/fibrous layer B/fibrous layer A. A point bonding finishing machine having an engraving roll with the surface engraved with the concave and convex embossing and a smoothing roll is utilized to perform partial thermal compression bonding on the laminated object at the temperature of 120° C. and the pressure of 1.96 MPa (20 Kgf/cm$^2$). Furthermore, the area ratio of the projection of the engraving roll is 25%, and the surface of distal portion of the projection is the rhombus shape. The physical properties of the laminated non-woven fabric are shown in Table 2.

The obtained laminated non-woven fabric has sufficient interlayer peeling strength, and the fluff peeled between the layers is not observed.

Example 11

In the fibrous layer B, A is used as the raw material resins, and the following devices and methods are utilized to manufacture the spun-bond non-woven fabric. A device including an extruder having a screw rod (diameter being 40 mm), a heating member and a gear pump; a spinneret (aperture being 0.4 mm, and 120 orifices); an air sucker; a charged process fiber-opening machine; a trapping conveyor equipped with the net made of polyester; a point bonding finishing machine; and a winder is used to manufacture the spun-bond non-woven fabric.

The raw material resin is plunged into the extruder, the heating member is utilized to make the resin be heated and melt at 230° C., then the gear pump is utilized to spurt the melting resin from each single orifice of the spinneret at the spinning speed of 0.57 g/minute, the spurted fiber is introduced into the air sucker, then immediately, the charged process fiber-opening machine is utilized to open the fiber, and then the fiber is trapped on the trapping conveyor. The air pressure of the air sucker is set as 196 kPa. The web on the trapping conveyor is plunged into the point bonding finishing machine (the compression bonding area ratio being 23%, and the projection being in the rhombus shape) with the upper and lower rolls heated to 50° C., and the winder is utilized to wind the machined non-woven fabric into the roll shape.

The fibrous layer A uses the PP/PE conjugate spun-bond non-woven fabric, EB40 ((commodity name), manufactured by Chisso, PP.PE), and the spun-bond non-woven fabric (the fibrous layer B) is laminated thereon. Therefore, the same fibrous layer A is superimposed on the fibrous layer B, so as to obtain a laminated object of fibrous layer A/fibrous layer B/fibrous layer A. A point bonding finishing machine having an engraving roll with the surface engraved with the concave and convex embossing and a smoothing roll is utilized to perform partial thermal compression bonding on the laminated object at the temperature of 110° C. and the pressure of 1.96 MPa (20 Kgf/cm$^2$). Furthermore, the area ratio of the projection of the engraving roll is 4%, and the surface of distal portion of the projection is the circular shape. The physical properties of the laminated non-woven fabric are shown in Table 2.

The obtained laminated non-woven fabric has sufficient interlayer peeling strength, and the fluff peeled between the layers is not observed.

Example 12

In the fibrous layer B, a mixture of A and B at the weight ratio 50:50 is used as the raw material resins, and the following devices and methods are utilized to manufacture the ventilating non-woven fabric. A spinning device including an extruder having a screw rod (diameter being 30 mm), a heating member and a gear pump; a spinneret (aperture being 0.6 mm, and the orifice number being 500); a silk guiding roll; and a winder is utilized, and further, a heat roll extension device is utilized to prepare the short fiber of 2.2 dtex and with the length of 51 mm. Subsequently, a carding machine is utilized to comb the obtained short fiber so as to manufacture a web, and then a hot air penetration dryer is utilized to perform heat treatment on the web at the temperature of 50° C., so as to obtain the ventilating non-woven fabric.

The fibrous layer A uses the spunlaced non-woven fabric used in Example 1, and the mixed fiber melt-blown non-woven fabric (the fibrous layer B) is laminated thereon. Therefore, the same fibrous layer A is superimposed on the fibrous layer B, so as to obtain a laminated object of fibrous layer A/fibrous layer B/fibrous layer A. A point bonding finishing machine having an engraving roll with the surface engraved with the concave and convex embossing and a smoothing roll is utilized to perform partial thermal compression bonding on the laminated object at the temperature of 110° C. and the pressure of 1.96 MPa (20 Kgf/cm$^2$). Furthermore, the area ratio of the projection of the engraving roll is 4%, and the surface of distal portion of the projection is the circular shape. The physical properties of the laminated non-woven fabric are shown in Table 2.

The obtained laminated non-woven fabric has sufficient interlayer peeling strength, and the fluff peeled between the layers is not observed.

Comparative Example 1

The fibrous layer B uses the mixed fiber melt-blown non-woven fabric according to Example 2.

The fibrous layer A uses the spunlaced non-woven fabric used in Example 1, and the mixed fiber melt-blown non-woven fabric (the fibrous layer B) is laminated thereon, so as to obtain a bi-layered laminated object of the fibrous layer A/the fibrous layer B. A point bonding finishing machine having an engraving roll with the surface engraved with the concave and convex embossing and a smoothing roll is utilized to perform partial thermal compression bonding on the laminated object at the temperature of 100° C. of the engraving roll, the temperature of 50° C. of the smoothing roll, and the pressure of 1.96 MPa (20 Kgf/cm$^2$). Furthermore, the area ratio of the projection of the engraving roll is 4%, and the surface of distal portion of the projection is the circular shape.

The result thereof is shown in Table 2. Although the laminated object is not welded with the roll during the partial thermal compression bonding, sufficient interlayer peeling strength is not obtained. Additionally, the fluff formed due to the interlayer peeling is observed.

Comparative Example 2

The fibrous layer B uses the mixed fiber melt-blown non-woven fabric according to Example 2.

The fibrous layer A uses the spunlaced non-woven fabric used in Example 1, and the mixed fiber melt-blown non-woven fabric (the fibrous layer B) is laminated thereon, so as to obtain a bi-layered laminated object of the fibrous layer A/the fibrous layer B. A point bonding finishing machine having an engraving roll with the surface engraved with the concave and convex embossing and a smoothing roll is utilized to perform partial thermal compression bonding on the laminated object at the temperature of 100° C. of the engraving roll, the temperature of 72° C. of the smoothing roll, and the pressure of 1.96 MPa (20 Kgf/cm$^2$). Furthermore, the area ratio of the projection of the engraving roll is 4%, and the surface of distal portion of the projection is the circular shape.

The result thereof is shown in Table 2. The laminated object is welded with the roll during the partial thermal compression bonding. Additionally, although sufficient interlayer peeling strength is obtained, the hand feeling is hardened.

Comparative Example 3

The fibrous layer A uses the mixed fiber melt-blown non-woven fabric according to Example 2 (that used as the fibrous layer B in Example 2).

The spunlaced non-woven fabric (that used as the fibrous layer A in Example 1) used in Example 1 is used as the fibrous layer B and is laminated on the mixed fiber melt-blown non-woven fabric. Therefore, the same mixed fiber melt-blown non-woven fabric is superimposed on the fibrous layer B to serve as the fibrous layer A, so as to obtain a laminated object of fibrous layer A/fibrous layer B/fibrous layer A. A point bonding finishing machine having an engraving roll with the surface engraved with the concave and convex embossing and a smoothing roll is utilized to perform partial thermal compression bonding on the laminated object at the temperature of 70° C. and the pressure of 1.96 MPa (20 Kgf/cm$^2$). Furthermore, the area ratio of the projection of the engraving roll is 4%, and the surface of distal portion of the projection is the circular shape.

The result thereof is shown in Table 2. Although the peeling strength of the laminated object is high, the roll is welded during the point thermal compression bonding.

TABLE 1

| | | | Example 1 | Example 2 | Example 3 | Example 4 | Example 5 | Example 6 | Example 7 | Example 8 |
|---|---|---|---|---|---|---|---|---|---|---|
| Fibrous layer B | Raw material resin 1 | | B | A | A | A | A | A | A | D |
| | Raw material resin 2 | | C | B | B | B | B | B | B | — |
| | Weight ratio (raw material resin 1: raw material resin 2) | | 50:50 | 50:50 | 50:50 | 50:50 | 50:50 | 50:50 | 50:50 | 100:0 |
| | Fiber shape | | mixed fiber | mixed fiber | mixed fiber | mixed fiber | mixed fiber | mixed fiber | mixed fiber | ordinary fiber |
| | Process | | melt-blown | Melt-blown | melt-blown | melt-blown | melt-blown | melt-blown | melt-blown | melt-blown |
| | Mass per unit area | g/m$^2$ | 20 | 20 | 20 | 10 | 20 | 20 | 20 | 100 |
| Fibrous layer A | Raw material fiber 1 | | rayon | cuprammonium | rayon | rayon | rayon | rayon | pulp | rayon |
| | Raw material fiber 2 | | pulp | — | pulp | pulp | — | PP | — | pulp |
| | Raw material fiber 3 | | rayon | — | rayon | rayon | — | PET | — | rayon |
| | Weight ratio (raw material fiber 1: raw material fiber 2: raw material fiber 3) | | 25:50:25 | 100:0:0 | 25:50:25 | 25:50:25 | 100:0:0 | 48:2:50 | 100:0:0 | 25:50:25 |
| | Process | | spunlaced | spunlaced | spunlaced | spunlaced | spunlaced | spunlaced | facial tissue base paper | spunlaced |
| | Form | | laminated | laminated | laminated | laminated | laminated | laminated | laminated | laminated |
| | Mass per unit area | g/m$^2$ | 39 | 23 | 39 | 39 | 30 | 38 | 12.5 | 39 |
| | Strength during drying (MD/CD) | N/25 mm | 15/5.1 | 10/1.5 | 15/5.1 | 15/5.1 | 13.6/4.8 | 33.3/6.9 | | 15/5.1 |
| | Elongation during drying (MD/CD) | % | 22/56 | 33/150 | 22/56 | 22/56 | 23.2/121 | 30.2/135 | | 22/56 |
| Laminated non-woven fabric | Laminating method | | embossment | embossment | embossment | embossment | embossment | embossment | embossment | embossment |
| | Point thermal compression bonding area ratio | % | 25 | 4 | 4 | 4 | 4 | 4 | 4 | 4 |
| | Machining temperature | ° C. | 110/110 | 80/80 | 100/100 | 100/100 | 130/130 | 100/100 | 120/120 | 110/110 |
| | Strength during drying (MD/CD) | N/25 mm | 37/14 | 24/5 | 26/11 | 24/9 | 37.1/8.8 | 88/18 | 12/2.0 | 25.2/14.8 |
| | Elongation during drying (MD/CD) | % | 24/66 | 31/151 | 22/66 | 22/72 | 25.4/150 | 34/148 | 14.6/10.8 | 22.6/67.7 |
| | Interlayer peeling strength | N/25 mm | 1.9/1.5 | 0.4/0.5 | 1.4/1.3 | 0.7/0.6 | 1.7/2.4 | 2.3/2.8 | 0.8/0.7 | 1.3/1.5 |
| | Liquid preservation amount | % | 467 | 910 | 846 | 955 | 877 | 670 | 880 | 464 |
| | Welding for roll (o: without welding, x: with welding) | | o | o | o | o | o | o | o | o |

TABLE 2

| | | | Example 9 | Example 10 | Example 11 | Example 12 | Comparative example 1 | Comparative example 2 | Comparative example 3 |
|---|---|---|---|---|---|---|---|---|---|
| Fibrous layer B | Raw material resin 1 | | B | A | A | A | A | A | rayon |
| | Raw material resin 2 | | E | B | — | B | B | B | pulp |
| | Weight ratio (raw material resin 1: raw material resin 2) | | 50:50 | 50:50 | 100:0 | 50:50 | 50:50 | 50:50 | 50:50 |
| | Fiber shape | | mixed fiber | mixed fiber | ordinary | mixed cotton | mixed fiber | mixed fiber | mixed fiber |
| | Process | | spun-bond | melt-blown | spun-bond | ventilating | melt-blown | melt-blown | spunlaced |
| | Mass per unit area | g/m$^2$ | 30 | 20 | | 50 | 20 | 20 | 39 |
| Fibrous layer A | Raw material fiber 1 | | rayon | PP | PP | rayon | rayon | rayon | A |
| | Raw material fiber 2 | | pulp | co-PP | PE | pulp | pulp | pulp | B |
| | Raw material fiber 3 | | rayon | — | — | rayon | rayon | rayon | — |
| | Weight ratio (raw material fiber 1: raw material fiber 2: raw material fiber 3) | | 25:50:25 | 60:40:0 | 50:50 | 25:50:25 | 25:50:25 | 25:50:25 | 50:50:0 |

TABLE 2-continued

|  |  |  | Example 9 | Example 10 | Example 11 | Example 12 | Comparative example 1 | Comparative example 2 | Comparative example 3 |
|---|---|---|---|---|---|---|---|---|---|
|  | Process |  | spunlaced | point bonding | spun-bond | spunlaced | spunlaced | spunlaced | melt-blown |
|  | Form |  | laminated | laminated | laminated | laminated | laminated | laminated | laminated |
|  | Mass per unit area | g/m² | 39 | 25 | 40 | 39 | 39 | 39 | 20 |
|  | Strength during drying (MD/CD) | N/25 mm | 15/5.1 | 21/3 | 40/25 | 15/5.1 | 15/5.1 | 15/5.1 | 2.0/1.7 |
|  | Elongation during drying (MD/CD) | % | 22/56 | 30/50 | 100/110 | 22/56 | 22/56 | 22/56 | 200/180 |
| Laminated non-woven fabric | Laminating method |  | embossment | embossment | embossment | embossment | embossment | embossment | embossment |
|  | Point thermal compression bonding area ratio | % | 4 | 25 | 4 | 4 | 4 | 4 | 4 |
|  | Machining temperature | ° C. | 130/130 | 120/120 | 110/110 | 110/110 | 50/100 | 72/100 | 70/70 |
|  | Strength during drying (MD/CD) | N/25 mm | 27/18 | 28/5.1 | 80/42 | 25/13 | 11/4.9 | 12/4.6 | — |
|  | Elongation during drying (MD/CD) | % | 22/61 | 35/48 | 100/105 | 20/68 | 22/94 | 25/85 | — |
|  | Interlayer peeling strength | N/25 mm | 2.0/2.3 | 2.5/2.1 | 3.1/2.9 | 0.9/0.8 | 0.2/0.2 | 0.7/0.8 | — |
|  | Liquid preservation amount | % | 650 | 310 | 200 | 520 | 898 | 722 | — |
|  | Welding for roll (o: without welding, x: with welding) |  | o | o | o | o | o | x | x |

INDUSTRY AVAILABILITY

The laminated non-woven fabric of the present invention is suitable for being attached to all parts of the human body, such as the entire face, the nose, the canthus, the mouth, the neck, the upper arm, the hand, the hand finger, the waist, the belly, the thigh, the calf, the knee, and the ankle, and specifically may be used for the face mask; the stretchable element of the hygienic material, such as the stretchable element for the disposable diaper, the stretchable element for the diaper, the stretchable element for the menstrual article, the stretchable element for the disposable underpants, the stretchable element for the diaper cover; the stretching belt, the adhesive plaster, the bandage, the protective equipment, the sack, and the stretchable element for the cloth, and besides, may be used for the foundation fabric of the wet cloth material, the foundation fabric of the plaster material, and the foundation fabric of the sliding-proof article, but is not limited thereto.

What is claimed is:

1. A laminated non-woven fabric, comprising two of fibrous layers A and a fibrous layer B disposed between the two of fibrous layers A, the fibrous layer B is obtained by using a fiber melting or softening at 120° C. or less, and the fibrous layer B is a mixed fiber obtained by using ethylene-octene copolymer having melting point of 76° C., and ethylene-octene copolymer having melting point of 100° C. as raw materials, and the two of fibrous layers A each comprising a fiber neither melting nor softening at 120° C. or less, wherein the fibrous layer A and the fibrous layer B are integrated through point thermal compression bonding, and interlayer peeling strength between the fibrous layer A and the fibrous layer B ranges from 0.3 Newton (N)/25 millimeters (mm) to 4.0 N/25 mm, and wherein the melting point or softening point of the fiber component in the fibrous layer A is 10° C. higher than that of the fiber component in the fibrous layer B.

2. The laminated non-woven fabric according to claim 1, wherein an area ratio occupied by a point thermal compression bonding portion on a surface of the laminated non-woven fabric ranges from 2% to 40%.

3. The laminated non-woven fabric according to claim 1, wherein at the point thermal compression bonding portion, a fiber forming the fibrous layer A maintains a fiber shape, and at a bonding point of a fiber forming the non-woven fabric, a fiber forming the fibrous layer B deforms in a manner of increasing a contact area with a surface of the fiber forming the non-woven fabric and is bonded integrally.

4. The laminated non-woven fabric according to claim 1, wherein the fiber forming the fibrous layer B is an elastomer fiber.

5. The laminated non-woven fabric according to claim 1, wherein the fibrous layer B is a fibrous layer formed of mixing at least two types of elastomer fibers with different melting points or different softening points.

6. The laminated non-woven fabric according to claim 1, wherein the fiber forming the fibrous layer B is an ultrafine long fiber with a fiber diameter being from 0.5 micrometer (μm) to 15 μm.

7. A manufactured article, obtained by using the laminated non-woven fabric according to claim 1.

* * * * *